United States Patent Office 3,773,784
Patented Nov. 20, 1973

---

3,773,784
PROCESS OF OXIDATIVE CATALYTIC DEHYDRO-CYCLIZATION OF SUBSTITUTED AROMATIC COMPOUNDS
Marcello Massi Mauri, San Donato Milanese, and Pietro Moggi, Milan, Italy, assignors to Snam Progetti S.p.A., Milan, Italy
No Drawing. Filed Oct. 16, 1970, Ser. No. 81,566
Claims priority, application Italy, Oct. 16, 1969; 23,437/69; Oct. 16, 1969, 23,438/69; Oct. 16, 1969, 23,439/69
Int. Cl. C07d 27/56, 63/20, 5/32
U.S. Cl. 260—319.1         9 Claims

ABSTRACT OF THE DISCLOSURE

Indoles, benzothiophenes and benzofurans are prepared by oxidative dehydrocyclization of substituted aromatic compounds in the presence of an oxygen-containing gas and an activated silica catalyst.

---

The present invention relates to a process of oxidative catalytic dehydrocyclization of substituted aromatic compounds in order to produce heterocyclic compounds containing oxygen, nitrogen or sulphur atoms in their heterocyclic ring.

Particularly the process according to the present invention may be used to produce indole from o-ethylaniline, benzofuran from o-ethylphenol, benzothiophene from o-ethylthiophenol and their derivatives starting from the corresponding substituted aromatic compounds.

Many interesting heterocyclic compounds have been synthesized but the methods for their preparation often employ very expensive raw materials and/or catalysts and base on difficult processes which often give rise to very low yields of the final product.

Some catalytic dehydrocyclization process of alkyl-substituted aromatic compounds have recently been proposed, particularly in order to produce indole from o-ethylaniline, which processes employed as catalysts cobalt molybdates or platinum or palladium on activated alumina carrier.

However the above processes have the disadvantage of a very high cost of the catalyst and of its very fast deactivation, owing to the formation of very high amounts of coke, which necessarily require frequent regenerations.

The object of the present invention consists in obtaining high yields of heterocyclic compounds by means of simple and cheap processes; particularly it consists in providing a cheap method for the synthesis of indole, benzofuran and benzothiophene, in which both the reaction product is obtained with very high selectivity and the formation of undesirable by-products like polymers and pitches is avoided.

According to the process of the present invention, a mixture of a substituted aromatic compound and oxygen, or a gas containing oxygen, is forced to pass through a reactor at high temperature and, according a preferable way of carrying it out, in presence of steam or any other inert diluent, on a catalyst essentially comprising activated silica, or a mixture of oxides of antimony and of a metal selected from the ones of the 3rd, 4th, 6th and 8th group of the periodic system, or a bismuth, molybdenum and vanadium base ternary compounds.

The aforesaid process can be carried out on many substituted aromatic compounds, which can be exemplified by the following general formula:

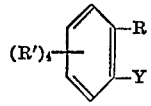

wherein R may be an alkyl radical with at least two carbon atoms; R' may be hydrogen, an alkyl or an aryl radical, a nitro-, halogen-, cyano-, amino-, alkoxy-, —OH, —SH, SO$_3$H group, or may be a divalent radical giving rise to a condensed ring; Y may be a member of the group consisting of —OH, —SH, —NH$_2$, —NHR", R" being an alkyl or an aryl radical.

Typical examples, not being however restrictive, of the process according to the present invention may be the preparations of indole from o-ethylaniline, scatole from o-isopropylaniline, benzofuran from o-ethylthiophenol, chinoline from o-propylaniline and the like.

The employed catalyst may consist of a bismuth, molybdenum and vanadium base ternary compound, the preparation of which is carried out according to Italian Pats. Nos. 690,486 and 769,588, or may consist of a mixture of antimony oxide and of an oxide of a metal selected from the ones belonging to the 3rd, 4th, 6th and 8th groups of the periodic system, for example an oxide of La, Ce, Th, Sn, Te, Fe, Co, Ni, U and so on, such catalysts being supported on any carrier known to the skilled in the art, or may be constituted by activated silica.

The catalyst may be employed in a fixed bed, and in a moving or fluid bed.

If activated silica is employed as catalyst in the oxidative catalytic dehydrocyclization of substituted aromatic compounds, it may be employed without additives, or little amounts of other components may be added to it.

For instance, it is possible to add components active as oxidation catalysts selected from oxides or mixtures of oxides of the 3rd, 4th, 5th, 6th and 8th groups of the periodic system, e.g. oxides or mixtures of oxides of cerium, tin, tellurium, titanium, phosphorus, arsenic, antimony, bismuth, vanadium, niobium, tantalium, chromium, molybdenum, wolfram, iron, cobalt or nickel. These additions make very high yields of the sought heterocyclic compound and can be obtained at temperatures lower than the ones required by the only activated silica. They totally have to be lower than 10% b.w. with respect to the silica in order to avoid the combustion reactions to prevail.

The process of the present invention is carried out in presence of oxygen, which may be supplied as such, as air or as any other gas containing oxygen. The molar ratio between oxygen and substituted aromatic compound has to be in the range from 0.2:1 to 5:1. By working at a molar ratio lower then 0.2:1 the reaction is carried out with low yields, whereas by working at a molar ratio higher than 5:1 the excessive oxidation products are prevailing. A particularly preferred range of oxygen to substituted aromatic compound molar ratios is the one from 0.8:1 to 2.5:1.

An inert diluent is advantageously employed, which diluent may be selected from steam, nitrogen, argon, carbon dioxide, saturated hydrocarbons as n-pentane, isopentane, n-hexane, n-heptane, or any other substance which is not modified by the reaction conditions.

The use of steam in a molar ratio to the aromatic compound comprised in the range from 5:1 to 75:1 is particularly advantageous.

The process according to the present invention is carried out at a temperature comprised in the range from 350 to 700° C., being the range from 400 to 500° C. particularly preferred.

The reaction pressure may vary in a large range, comprised between mm. Hg and 10 atmospheres, being the process preferred to be carried out at the atmospheric pressure.

The apparent contact time between reactants and catalysts is selected in the range from 0.1 to 10 seconds, being the range from 0.2 to 2.5 seconds particularly preferred.

As apparent contact time between reactants and catalysts we will mean the ratio between the volume of the catalytic bed and the flow of the reactants as gas at the reaction conditions.

The invention will now be illustrated by the following examples, which have not to be understood as restrictive of it. Therein the conversion, selectively and yield terms have to be understood according to the enclosed definitions.

$$\text{Conversion} = \frac{\text{moles of reacted organic compound}}{\text{moles of fed organic compound}} \cdot 100$$

$$\text{Selectivity} = \frac{\text{moles of obtained product}}{\text{moles of reacted organic compound}} \cdot 100$$

$$\text{Yield} = \frac{\text{moles of obtained compound}}{\text{moles of fed organic compound}} \cdot 100$$

EXAMPLE 1 o-Ethylaniline has been contacted with some materials in a stainless steel reactor having the internal diameter of ⅞" and heated by electric heating, at atmospheric pressure, by feeding o-ethylaniline, air and water at a molar ratio of 1:8:30 and at a contact time of ¼". Several proofs were carried out at different temperatures in the 500–600° C. range. The best results of the selectivity to indole by means of the some materials are reported on Table 1.

The advantages of the oxidative dehydrocyclization turn out very clear with respect to the same process carried out in absence of air.

Moreover working at high temperature and a low oxygen/o-ethylaniline ratios seems to be very profitable; accordingly one obtains a high yield of useful products; in fact both the o-aminostyrole may be changed into indole in a following recycle and one has a little forming of combustion products. On the contrary the contact time does not seem to be a determining parameter. By observing the above results one takes notice that the silica is a catalyst very selective in the oxidative dehydrocyclization of o-ethylaniline to indole.

EXAMPLE 3 o-Ethylphenol, air and water were supplied to the same reactor of Example 2, on a 545 cc. catalytic bed of the same catalyst, at atmospheric pressure. At a contact time of 0.8 second, the temperature was varied between 560 and 580° C. and the air/o-ethylphenol molar ratio between 4:1 and 6:1, whereas the $H_2O$/o-ethylphenol molar

TABLE 1

| Catalyst | Temp., °C. | o-Ethyl-aniline conversion, percent | Products selectivity percent (as $C_8$) | | | | | Indole yield, percent |
| --- | --- | --- | --- | --- | --- | --- | --- | --- |
| | | | o-Amino-styrole | Indole | Aniline | $CO-CO_2$ | Ethylene | |
| No catalyst | 580 | 55.5 | 43 | 29 | | 9.5 | | 16 |
| Iron shavings | 570 | 47.5 | 20 | 31.5 | | 21.5 | | 15 |
| Pumice | 575 | 47 | 40 | 33 | | 11.5 | | 15.5 |
| γ-$Al_2O_3$ | 580 | 71 | | 18 | 46 | 21 | 13 | 13 |
| 75% $SiO_2$, 25% $Al_2O_3$ | 500 | 59.5 | 12.5 | 7 | 24 | 24 | 8 | 4 |
| Zeolite 13 X | 505 | 43.5 | 27.5 | 28 | | 31.5 | | 12 |
| $SiO_2$ | 555 | 57.5 | 12.5 | 58 | | 20 | | 33.5 |

The properties of the activated silica as selective catalyst in the oxidative dehydrocyclization of o-ethylaniline to indole turn out very clear from Table 1.

EXAMPLE 2

A stainless steel reactor having the internal diameter of ⅞" and heated by electric heating, was loaded with 390 cc. of silica, having a specific surface of 240 m.²/g., which silica having been extruded in the form of little cylinder having a 4 mm. diameter and an 8 mm. length, dried at 150° C. and then calcined in muffle for 2 hours at 500° C.

o-Ethylaniline, air and water were supplied to the reactor at a pressure little higher than the atmospheric one.

Several proofs were carried out by modifying the temperature, the contact time and the oxygen/o-ethylaniline molar ratio. On the contrary the water/o-ethylaniline molar ratio was kept constant. The obtained results are reported on Table 2.

ratio was kept constant. The results of Table 3 were obtained.

TABLE 3

| Average temp., °C. | Air/ o-ethyl-phenol, moles | o-Ethyl-phenol conversion, percent | Products selectivity percent (as $C_8$) | | | Benzofuran yield, percent |
| --- | --- | --- | --- | --- | --- | --- |
| | | | Benzofuran | $CO+CO_2$ | | |
| 560 | 4 | 56 | 75 | 8 | | 42 |
| | 6 | 70 | 71 | 10 | | 50 |
| 580 | 6 | 73 | 71 | 10 | | 52 |

EXAMPLE 4

Higher than 50% yields of benzothiophene were obtained by working at the same conditions of Example 3 and by supplying o-ethylthiophenol, air and water to the reactor.

EXAMPLE 5

Some tests were carried out by employing silica at different specific surface. o-Ethylaniline, air and water were

TABLE 2

| Average temp., °C. | Contact time, sec. | $O_2$/o-ethyl-aniline, moles/mole | Conversion o-ethyl-aniline, percent | Selectivity products (as $C_8$) percent | | | Yield indole, percent |
| --- | --- | --- | --- | --- | --- | --- | --- |
| | | | | o-Amino-styrole | Indole | $CO-CO_2$ | |
| 540 | 1.0 | | 14 | | | | |
| 500 | 1.0 | 0.9 | 27.5 | 36.5 | 45 | 15 | 12.5 |
| | 1.0 | 1.7 | 35.5 | 20.5 | 39.5 | 21 | 14 |
| 550 | 1.0 | 1.7 | 48.5 | 14.5 | 52.5 | 25.5 | 25.5 |
| | 1.4 | 1.7 | 50 | 14 | 54.5 | 23 | 27 |
| 580 | 1.0 | 0.8 | 36 | 23 | 60 | 15 | 21.5 |
| | 1.0 | 1.3 | 50 | 15 | 57.5 | 16.5 | 29 |
| | 1.0 | 1.7 | 54 | 13.5 | 54.5 | 24 | 29.5 |
| | 1.0 | 2.0 | 63 | 10 | 54.5 | 26.5 | 34.5 |
| | 0.5 | 0.8 | 36 | 26 | 58.5 | 15 | 21 |
| | 1.5 | 0.8 | 32 | 22 | 59 | 18.5 | 19 |
| | 0.5 | 1.7 | 48 | 20 | 44.5 | 23 | 21.5 |
| | 1.5 | 1.7 | 47 | 19.5 | 52 | 26 | 24.5 | supplied to a stainless steel reactor having the internal diameter of ⅞" and the catalytic bed of 1 m. at a molar ratio of 1:6:30, at atmospheric pressure, at a temperature of 580° C. and at contact time of 1.0 seconds. The results are reported on Table 4.

TABLE 4

| Catalyst | Celite | $SiO_2$. Ludox H.S. | $SiO_2$. Ludox A.S. | $SiO_2$ gel |
|---|---|---|---|---|
| Specific surface. M.²/g | <5 | 155 | 240 | 230 |
| Conversion, o-ethylaniline, percent | 46 | 56 | 57 | 35 |
| Selectivity indole, percent | 57.5 | 55 | 57.5 | 56.5 |
| Selectivity o-aminostyrole, percent | 12.5 | 12.5 | 11.5 | 13 |
| Selectivity $CO+CO_2$, percent | 22.5 | 14 | 14.5 | 13.5 |
| Yield indole, percent | 26.5 | 31 | 33 | 31 |

EXAMPLE 6 o-Ethylaniline, air and water, and then o-ethylaniline, air, water and nitrogen were supplied to a reactor equal to the one of the preceding example, at molar ratios of 1:6:30 and 1:6:20:10, by working in presence of a $SiO_2$ Ludox A.S. catalyst, at a temperature of 580° C., at atmospheric pressure and at a contact time of 1 second. The obtained results are reported on Table 5.

TABLE 5

| | Feeding | |
|---|---|---|
| | OEA/air/$H_2O$ 1:6:30 | OEA/air/$H_2O/N_2$ 1:6:20:10 |
| Conversion o-ethylaniline, percent | 51.5 | 42.5 |
| Selectivity indole, percent | 54 | 30.5 |
| Selectivity aminostyrole, percent | 14.5 | 16 |
| Selectivity $CO+CO_2$, percent | 17.5 | 26 |
| Yield indole, percent | 28 | 13 |

OEA = o-Ethylaniline.

EXAMPLE 7

A test on a fluid bed was carried out; the working conditions and the results are reported on Table 6.

TABLE 6

Catalyst:
 Atomized $SiO_2$ Ludox A.S.
 Granulometry=90% b.w. between 30 and 120μ
 Surface area=298 m.²/gr.
 Pores volume=0.159 cc./gr.
 Real density=2.24 gr./cc.
Reactor:
 φ int.=1½", h.=1.2 m.
 Electric heating
 Loaded catalyst=250 g.
 Temperature=560° C.
 Atmospheric pressure
 Linear speed=4 cm./sec.

o-Ethylaniline/air/water supplied at a molar ratio of 1:6:10:

Conversion o-ethylaniline 69%
 Selectivity indole 68%
 Selectivity o-aminostyrole 12%

EXAMPLE 8

Some tests were carried out by working on a fluid bed.

The working conditions were the following ones:
 Reactor=φ int.=6", h.=11 m.
 Melted salts heating
 Loaded catalyst=19.2 kg.

Feeding:
 o-Ethylaniline, air and water preheated at 500° C.
 $H_2O$/o-ethylaniline molar ratio=10:1
 Atmospheric pressure The obtained results are reported on Table 7.

TABLE 7

| | Average temperature, ° C. | | | | | | | | |
|---|---|---|---|---|---|---|---|---|---|
| | 520 | 540 | 550 | 560 | 540 | 545 | 540 | 540 | 545 |
| Linear speed, cm./sec | 40 | 40 | 40 | 40 | 40 | 40 | 40 | 20 | 50 |
| $O_2$/o-ethylaniline, moles/mole | 1.2 | 1.3 | 1.2 | 1.2 | 0.5 | 0.9 | 1.8 | 1.3 | 1.3 |
| Conversion o-ethylaniline, percent | 49 | 55 | 59 | 60.5 | 39.5 | 47 | 57 | 53 | 52 |
| Selectivity indole, percent | 59 | 64 | 69 | 69 | 35 | 60.5 | 56 | 65 | 59 |
| Selectivity o-aminostyrole, percent | 14 | 12 | 11 | 10 | 16.5 | 14.5 | 14 | 11.5 | 16 |
| Selectivity $CO+CO_2$, percent | 15.5 | 15.5 | 12 | 11.5 | 6 | 11 | 21 | 12.5 | 16 |
| Yield indole, percent | 29 | 35 | 41 | 42 | 14 | 28 | 32 | 34 | 31 |

EXAMPLE 9

Some tests were carried out by working at different $H_2O$/OEA ratios. The working conditions were the following ones:

Reactor: φ int. 1½", h.=1.2 m.
Electric heating
Loaded catalyst=100 g.
Atmospheric pressure
Linear speed=6 cm./sec.
Air/o-ethylaniline molar ratio=6:1

The obtained results are reported on Table 8.

TABLE 8

| | Average temperature, ° C. | | | | | | |
|---|---|---|---|---|---|---|---|
| | 540 | 570 | 560 | 580 | 570 | 590 | 590 |
| $H_2O$/o-ethylaniline, moles/mole | | | 4.5 | 4.5 | 10.5 | 10.5 | 17 |
| Conversion o-ethylaniline, percent | 12.5 | 20.5 | 42 | 44 | 53.5 | 54 | 60 |
| Selectivity indole, percent | 15.5 | 18 | 60 | 61.5 | 63 | 56.5 | 56.5 |
| Selectivity o-aminostyrole, percent | 14 | 18 | 17 | 16 | 12 | 11 | 12 |
| Selectivity $CO+CO_2$, percent | 69 | 58.5 | 15 | 11.5 | 16.5 | 17.5 | 16.5 |
| Yield indole, percent | 2 | 3.5 | 25 | 27 | 34 | 31 | 34 |

EXAMPLE 10

The catalyst was obtained by melting $Fe(NO_3)_3 \cdot H_2O$ and then by adding little parts of $Sb_2O_3$.

At the end of the adding of $Sb_2O_3$ the reaction mixture was heated up to the disappearance of the introus vapors. The activation was carried out by heating for: 12 hours at 150° C.; 16 hours at 400° C.; 12 hours at 650° C.; 12 hours at 750° C.; and 48 hours at 850° C.

The final composition of the catalyst was the following one:

$Fe_2O_3$: 21.5% b.w.
$Sb_2O_3$: 78.5% b.w.

corresponding to a Sb/Fe atomic ratio of 2:1.

EXAMPLE 11

A catalyst consisting of antimony and uranium oxide was prepared according to the following process.

A dust of metallic antimony was dissolved into concentrated HNO₃ and uranyl nitrate was dissolved into water. The two solutions were brought to a pH of about 8 by adding watery ammonia after they had been joined together. The obtained precipitate was filtered and washed by distilled water, then it was dispersed into colloidal silica.

The catalyst was subjected to an atomization and transformed into tablets after the adding of the 30% b.w. of NH₄HCO₃; then it was calcined in the presence of an air flow for 4 hours at 750° C. The final composition of the catalyst was the following one:

U₃O₈: 17.3% b.w.
Sb₂O₅: 43.2% b.w.
SiO₂: 40.1% b.w.

corresponding to a Sb/U atomic ratio of 4.5:1.

EXAMPLE 12 o-Ethylaniline was contacted with the catalyst in a reactor at atmospheric pressure, by feeding o-ethylaniline, air and water at a molar ratio of 1:8:30. The catalyst was the one of Example 1, the catalytic bed having the following dimensions: h.=0.70 m., V=270 cc.

The results of Table 9 were obtained by varying both the temperature and the contact time.

TABLE 9

| Average temp., ° C. | Contact time | Conversion o-ethylaniline, percent | Selectivity indole, percent | Yield indole, percent |
| --- | --- | --- | --- | --- |
| 407 | 0.70 | 24.5 | 12 | 3 |
| 454 | 0.70 | 38 | 20.5 | 8 |
| 494 | 0.70 | 49.5 | 41.5 | 20.5 |
| 530 | 0.45 | 54 | 50 | 27 |

EXAMPLE 13

The catalyst of Example 11 was employed in a catalytic bed having a 1 m. height and a 387 cc. volume. o-Ethylaniline, air and water were supplied in a molar ratio of 1:8:50, at atmospheric pressure and at a contact time of 1 sec. The results reported on Table 10 were obtained by working at two different temperatures.

TABLE 10

| Average temp. ° C. | Conversion o-ethylaniline, percent | Selectivity indole, percent | Yield indole, percent |
| --- | --- | --- | --- |
| 510 | 48 | 44 | 21 |
| 550 | 49.5 | 50.5 | 25 |

EXAMPLE 14 o-Ethylaniline was contacted with the catalytic system in a stainless steel reactor having the internal diameter of ⅞″ at atmospheric pressure, by feeding o-ethylaniline, air and water at an o-ethylaniline/water ratio of 1:25. The catalyst, consisting of a ternary compound comprising 0.1V₂O₅·1BiO₂O₃·2.7MoO₃, and prepared according to Italian Pat. No. 690,486 was supported on 40% of SiO₂; the catalytic bed had a 0.62 m. height and a 240 cc. volume. Some tests were carried out by varying the working conditions. The results are reported on Table 11.

TABLE 11

| | Average temperature, ° C. | | | | |
| --- | --- | --- | --- | --- | --- |
| | 431 | 437 | 435 | 434 | 430 |
| Contact time, sec | 1.10 | 1.00 | 0.75 | 0.70 | 1.20 |
| Moles O₂/moles o-ethylaniline | 1.2 | 2.1 | 2.1 | 2.1 | 2.2 |
| Conversion o-ethylaniline, percent | 30 | 42.5 | 36.5 | 37 | 45.5 |
| Selectivity indole, percent | 41.5 | 37.5 | 43 | 42.5 | 37 |
| Yield indole, percent | 12.5 | 16 | 15.5 | 16 | 17 |

EXAMPLE 15 o-Ethylaniline, air and water were supplied to a stainless steel reactor having the internal diameter of ⅞″, in presence of a catalytic system consisting of

$$0.6V_2O_5 \cdot 1Bi_2O_3 \cdot 1.6MoO_3$$

the preparation of which is described in Italian Pat. No. 769,558 and supported on 40% of silica. The reaction was carried out at atmospheric pressure, the contact time between reactants and catalyst being of 0.50 second. Some tests were carried out at different temperatures. The results are reported on Table 12.

TABLE 12

| | Average temperature, ° C. | | |
| --- | --- | --- | --- |
| | 415 | 452 | 496 |
| Moles O₂/moles o-ethylaniline | 1.2 | 1.7 | 1.7 |
| Moles H₂O/moles o-ethylaniline | 29 | 52 | 70 |
| Conversion o-ethylaniline, percent | 22 | 33 | 41 |
| Selectivity indole, percent | 24.4 | 37 | 41.5 |
| Yield indole, percent | 5.5 | 12 | 17 |

EXAMPLE 16

The reaction was carried out at the same conditions of the preceding examples, by working on a catalytic system having the same composition of the preceding example in a bed diluted by inert material in a ratio of 1:4 which bed having a 0.67 m. height and a 260 cc. volume. The results are reported on Table 13.

TABLE 13

| | Average temperature, ° C. | | | | | | | |
| --- | --- | --- | --- | --- | --- | --- | --- | --- |
| | 473 | 504 | 554 | 552 | 530 | 530 | 530 | 572 |
| Contact time, sec | 0.40 | 0.40 | 0.40 | 0.30 | 0.30 | 0.30 | 0.30 | 0.30 |
| Moles O₂/moles o-ethylaniline | 1.7 | 1.7 | 1.7 | 1.7 | 1.3 | 0.8 | 0.8 | 0.8 |
| Moles H₂O/moles o-ethylaniline | 35 | 35 | 35 | 35 | 35 | 35 | 20 | 20 |
| Conversion o-ethylaniline, percent | 23.5 | 33.5 | 42 | 24.5 | 19.5 | 13 | 10 | 20.5 |
| Selectivity indole, percent | 34.5 | 36 | 38.5 | 42.5 | 46 | 52 | 37.5 | 54.5 |
| Yield indole, percent | 8 | 12 | 16 | 10.5 | 9.5 | 7 | 7 | 11 |

EXAMPLE 17

Some tests were carried out on a catalyst consisting of 0.6V₂O₅·1Bi₂O₃·1.6MoO₃ supported on 15% of SiO₂ by working in the same reactor of the preceding examples. The catalytic bed had a 1.21 m. height and a 510 cc. volume. The results reported on Table 14 were obtained by feeding o-ethylaniline, air and water. The o-ethylaniline/water ratio always was 1:50.

TABLE 14

| | Average temperature, ° C. | | | |
| --- | --- | --- | --- | --- |
| | 504 | 527 | 502 | 500 |
| Contact time, sec | 0.60 | 0.60 | 0.60 | 1.20 |
| Moles O₂/moles o-methylaniline, percent | 1.3 | 1.2 | 2.1 | 1.2 |
| Conversion o-ethylaniline, percent | 45 | 33 | 54.5 | 39.5 |
| Selectivity indole, percent | 39.5 | 40 | 36 | 37 |
| Yield indole, percent | 18 | 13 | 19.5 | 14.5 |

EXAMPLE 18

Benzofuran was obtained at selectivities higher than 60% and yields higher than 40% by feeding o-ethylphenol, air and water in a molar ratio of 1:8:30, at 550° C. and at a contact time of 1 sec. and by working on the same catalyst and reactor of Example 17.

EXAMPLE 19

Very high selectivities and yields of benzothiophene were obtained by feeding o-ethylthiophenol, air and water and working at the same conditions of Example 18.

What we claim is:

1. In a process for the oxidative catalytic dehydrocyclization of substituted aromatic compounds of the formula:

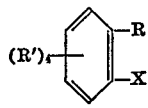

wherein R is lower alkyl containing at least two carbon; R' is hydrogen, alkyl, aryl, alkoxy, nitro, halogen, cyano, amino, hydroxy, SH or $SO_3H$; Y is OH, SH, $NH_2$, monoalkylamino or monoarylamino; the improvement which consists essentially of contacting said substituted aromatic compound with oxygen or an oxygen-containing gas and an activated silica catalyst at a temperature ranging from 350° C. to 700° C. and a pressure of from about 1 mm. Hg to 10 atmospheres, the molar ratio of oxygen or oxygen-containing gas to substituted aromatic compound ranging from 0.2-1 to 5:1.

2. A process according to claim 1 wherein said temperature is 400–500° C.

3. A process according to claim 1 wherein said pressure is atmospheric pressure.

4. A process according to claim 1 wherein it is carried out in presence of a diluent inert.

5. A process according to claim 4 wherein said reaction mixture diluent is selected from steam, nitrogen, argon, carbon dioxide, or saturated hydrocarbons.

6. A process according to claim 1 wherein said molar ratio is .8:1 to 2.5:1.

7. A process according to claim 1 wherein the substituted aromatic compound is orthoethylaniline.

8. A process according to claim 1 wherein the substituted aromatic compound is orthoethylphenol.

9. A process according to claim 1 wherein the substituted aromatic compound is orthoethylthiophenol.

References Cited
UNITED STATES PATENTS
3,441,569  4/1969  Hargis et al.  ------  260—319.1

JOSEPH A. NARCAVAGE, Primary Examiner

U.S. Cl. X.R.

260—330.5, 346.2 R